July 9, 1940.  R. A. GOEPFRICH  2,207,173
BRAKE
Filed July 6, 1937  2 Sheets-Sheet 1
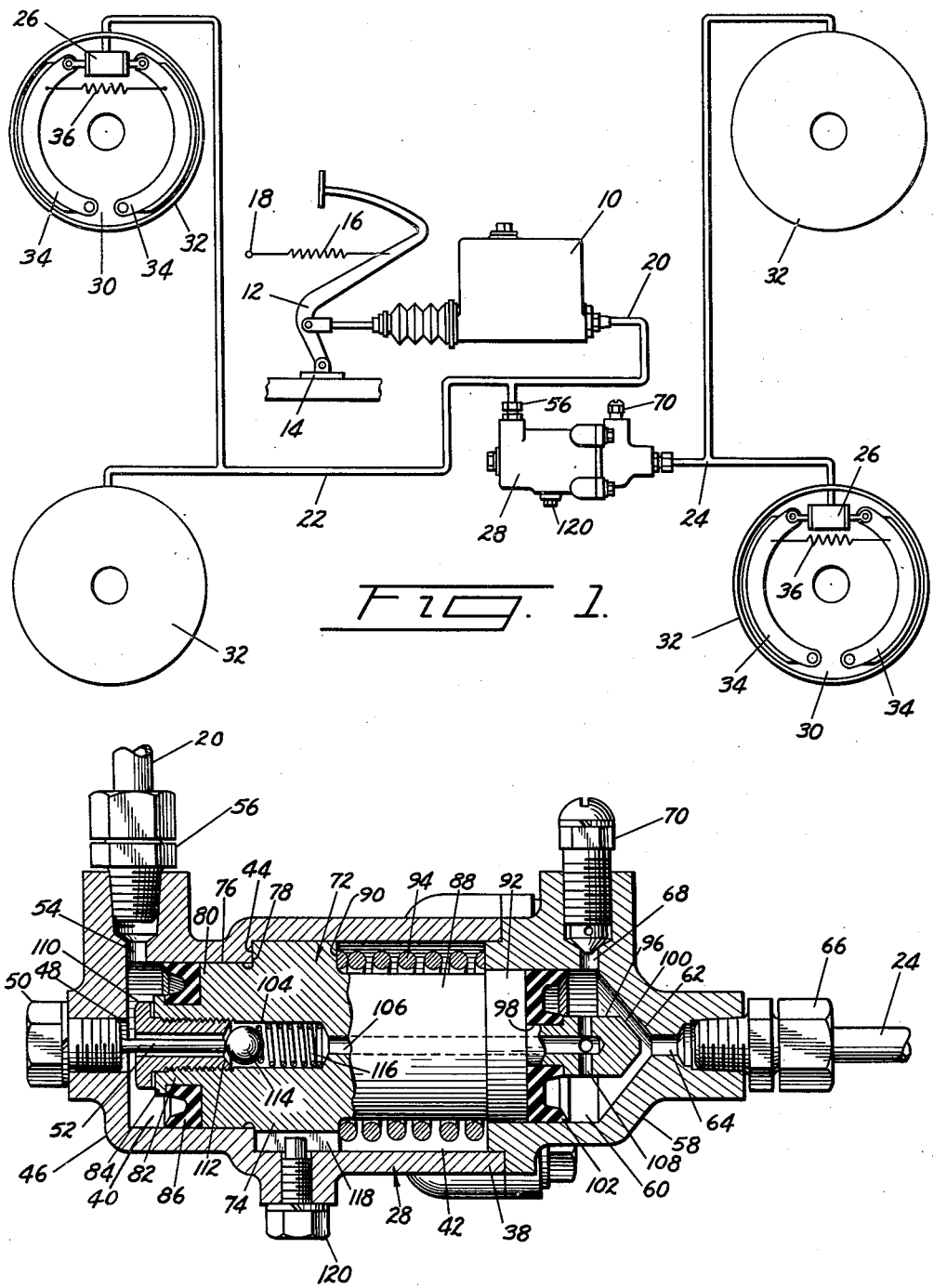
INVENTOR.
RUDOLPH A. GOEPFRICH
BY
Jerome R. Cox
ATTORNEY.

July 9, 1940. R. A. GOEPFRICH 2,207,173
BRAKE
Filed July 6, 1937 2 Sheets-Sheet 2

INVENTOR.
RUDOLPH G. GOEPFRICH
BY Jerome R. Cox,
ATTORNEY.

Patented July 9, 1940

2,207,173

UNITED STATES PATENT OFFICE 2,207,173

BRAKE

Rudolph A. Goepfrich, South Bend, Ind., assignor to Bendix Products Corporation, South Bend, Ind., a corporation of Indiana Application July 6, 1937, Serial No. 152,054

14 Claims. (Cl. 188—152)

This invention relates to fluid pressure braking systems for motor vehicles.

Broadly the invention comprehends a fluid pressure braking system for motor vehicles embodying means for applying the brakes associated with the rear wheels of the vehicle with a greater amount of braking effect than may be applied by the brakes associated with the front wheels of the vehicle.

An object of the invention is to provide a fluid pressure braking system for a motor vehicle operative to change the ratio of the braking effect between the brakes associated with the rear wheels of the vehicle and the brakes associated with the front wheels of the vehicle.

Another object of the invention is to provide a fluid pressure braking system for motor vehicles operative to automatically change the ratio of the braking effect between the brakes associated with the rear wheels of a vehicle and the brakes associated with the front wheels of the vehicle.

Another object of the invention is to provide a fluid pressure braking system operative to automatically reduce proportionately the ratio of the braking effect of the brakes associated with the rear wheels of a vehicle and the brakes associated with the front wheels of the vehicle.

Other objects of the invention will appear from the following description taken in connection with the drawings forming a part of this specification, and in which—

Fig. 1 is a diagrammatical illustration of a fluid pressure braking system embodying the invention;

Fig. 2 is a longitudinal sectional view of the ratio changer;

Figure 3:
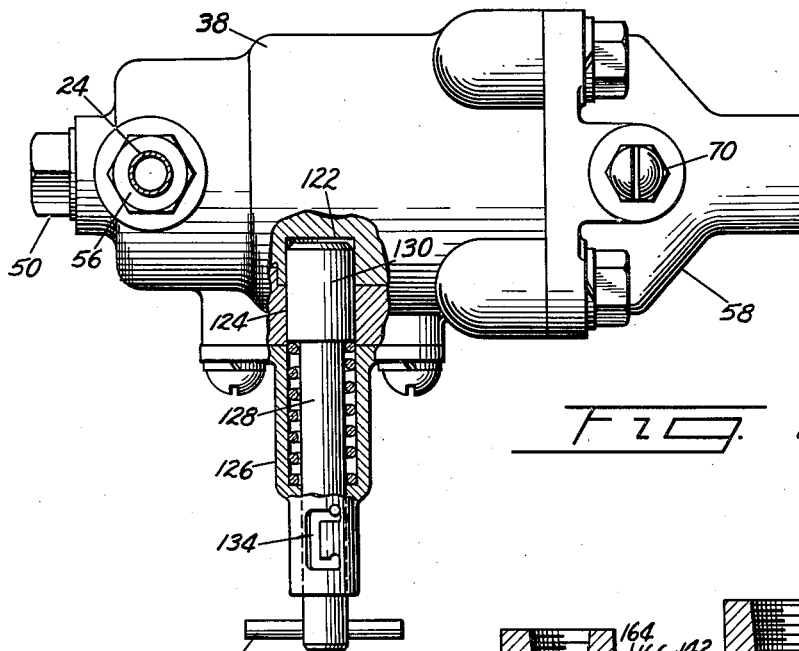
Fig. 3 is a top plan view of the ratio changer.

Referring to the drawings for more specific details of the invention, 10 represents a fluid pressure producing device of conventional type adapted to be actuated by a foot pedal lever 12 pivoted on a suitable support 14 and connected by a retractile spring 16 to a fixed support 18.

A fluid pressure delivery pipe or conduit 20 suitably connected to the fluid pressure producing device 10 has branches 22 and 24 connected respectively to fluid pressure actuated motors 26 arranged in pairs, one pair for actuating the brakes associated with the front wheels of a vehicle and another pair for actuating the brakes associated with the rear wheels of the vehicle; and suitably connected in the fluid pressure delivery pipe or conduit 24 for delivering fluid under pressure to the fluid pressure actuated motors associated with the front wheels of the vehicle is a ratio changer 28, the purpose of which will hereinafter appear.

The brakes may be of conventional type each including a fixed support or backing plate 30 adapted to be secured to an axle or to an axle housing, a rotatable drum 32 associated with the backing plate and adapted to be secured to a wheel, a pair of corresponding friction elements or shoes 34 pivoted on the backing plate, and a motor corresponding to the motors 26 mounted on the backing plate between the friction elements or shoes 34 and operative to spread the shoes into engagement with the drum 32 against the resistance of a retractile spring 36 connecting the shoes.

The ratio changer 28 includes a cylinder 38 having a small chamber 40 and a large chamber 42 arranged concentrically to and opening directly into the smaller chamber and providing at its junction with the small chamber an annular shoulder 44. The smaller chamber has a head 46 provided with a concentric opening 48 normally closed as by a plug 50 having thereon a concentric pin 52, the purpose of which will hereinafter appear, and arranged in the wall of the chamber adjacent the head 46 is a port 54 connected as by a fitting 56 to the fluid pressure delivery pipe 20.

A head 58 fitted in the open end of the large chamber 42 has therein a chamber 60 of smaller diameter than the chamber 40. The chamber 60 is concentrically disposed to and in direct communication with the large chamber 42, and the chamber 60 has a frustro-conical portion 62 communicating at its apex with a port 64 in the head 58. The port is connected as by a suitable fitting 66 to the fluid pressure delivery pipe 24; and arranged in the wall of the chamber 60 is a port 68 normally closed as by a bleeder screw 70.

A piston 72 reciprocable in the chambers 40, 42 and 60 includes a body 74 fitted in the chamber 42. The body has a concentric part 76 of reduced diameter fitted in the chamber 40. This reduced part 76 provides at its junction with the body an annular shoulder 78 normally seated on the annular shoulder 44 of the cylinder and also has a head 80 having an extension 82 provided with a circumferential flange 84. A sealing cup 86 seated on the head 80 embraces the extension 82, and the flange 84 on the extension serves to retain the cup against displacement.

The body 74 of the piston also has a concentric part 88 of reduced diameter providing at its junction with the body an annular shoulder 90 and also has a head 92 fitted in the chamber 60. A spring 94 sleeved on the reduced part 88 between the shoulder 90 and the head 58 of the cylinder urges the piston to its seat on the annular shoulder 44 of the cylinder. The head 92 has an extension 96 provided with a circumferential groove 98 and a conical end 100 adapted to seat in the conical portion 62 of the chamber 60 so as to close the port 64. A sealing cup 102 on the head 92 has a lip fitted in the groove 98 in the extension 96 so as to retain the cup against displacement.

The piston 72 has therein a valve chamber 104 and an axial passage 106 intercepted by a plurality of diametral passages 108 in the extension 96. The valve chamber and the passages provide a communication between the chamber 40 and the chamber 60, and this communication is controlled by a suitable valve. As shown, the open end of the valve chamber 104 has secured therein a hollow plug 110 receiving the pin 52 on the plug 50, and the inner end of the plug 110 is counter-sunk to provide a valve seat 112 for a ball valve 114 urged to its seat by a spring 116.

The piston 72 has a longitudinal slot 118, and a screw 120 mounted in the wall of the cylinder has a part received by the slot so as to inhibit rotation of the piston within the cylinder. The piston also has a recess 122 adapted to register with an opening 124 in the wall of the cylinder, and a casing 126 mounted on the wall of the cylinder has therein a spring-presed plunger 128 provided with a head 130 reciprocable in the opening 124 and adapted to enter the recess 122 so as to lock the piston 72 against movement. The plunger 128 is provided with a handle 132 by which it may be extracted from the recess 122, and a suitable lock 134 is provided for retaining the plunger in both advanced and retracted positions.

Figure 4:
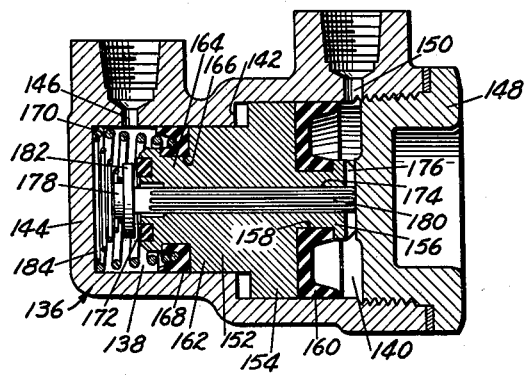
Fig. 4 is a longitudinal sectional view illustrating a modified form of the ratio changer.
Figure 5:
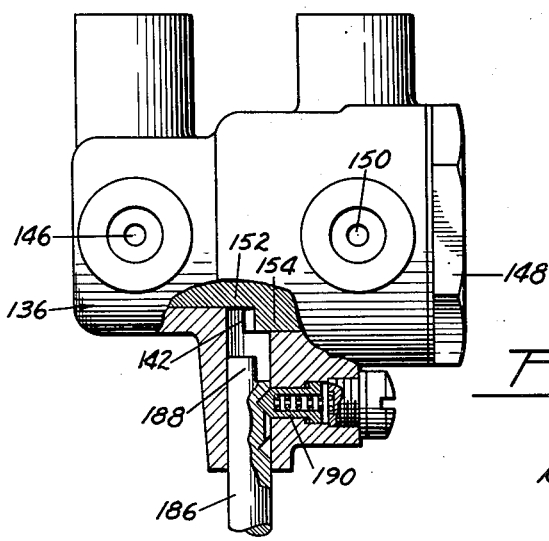
Fig. 5 is a top plan view of the modification illustrated in Fig. 4.

A modification of the ratio changer is illustrated in Figs. 4 and 5. In this modification a double diametral cylinder 136 includes a small chamber 138 and a large chamber 140 arranged concentrically to and in direct communication with the smaller chamber and providing at its junction with the smaller chamber an annular shoulder 142. The small chamber is closed by a head 144 and the chamber has in its wall adjacent the head a port 146 adapted to be connected to the fluid pressure delivery pipe or conduit 20. The large chamber 140 is closed as by a head 148 and has in its wall adjacent its head a port 150 adapted to be connected to the fluid pressure delivery pipe 24.

A piston 152 reciprocable in the cylinder has on one end a head 154 fitted in the large chamber 140. The head 154 has an extension 156 provided with a circumferential slot 158 and a sealing cup 160 seated on the head has a lip fitted in the slot so as to retain the cup against displacement. The other end of the piston has a head 162 fitted in the chamber 138. The head 162 has an extension 164 provided with a circumferential slot 166, and a sealing cup 168 seated on the head has a lip fitted in the groove, and a spring 170 interposed between the cup and the head 144 normally retains the piston against the head 148. The extension 164 also has a groove in its face in which is fitted a valve seat 172.

The piston 152 has an axial passage 174 intercepted by a transverse slot 176 in the end of the extension 156. This passage and slot provide a communication between the chamber 138 and the chamber 140. A valve 178 for controlling the communication has a slotted stem 180 reciprocable in the passage and a head 182 for cooperation with the valve seat 172. A spring 184 interposed between the valve 178 and the head 144 of the cylinder urges the valve to its seat, and the stem 180 of the valve is adapted to cooperate with the head 148 to move the valve from its seat. A plunger 186 mounted on the wall of the cylinder has a part 188 adapted to engage and lock the piston against movement, and a spring-pressed pin 190 is adapted to cooperate with a plurality of notches in the plunger for retaining the plunger in either locked or disengaged position.

Assuming that the system is installed substantially as illustrated and described, and that the ratio changer 28 connected in the system is unlocked, under these conditions, upon depressing the foot pedal lever 12 the fluid pressure producing device 10 is actuated to displace fluid therefrom through the fluid pressure delivery pipe 20 and its respective branches into the fluid pressure actuated motors 26, causing actuation of the motors, and this actuation of the motors results in movement of the shoes 34 into engagement with the drums 32 against the resistance of the retractile springs 36.

Fluid under pressure enters the chamber 40 of the ratio changer 28 by way of the port 54, and is displaced therefrom through the hollow plug 110, past the valve 114, through the valve chamber 104, the passages 106 and 108, into the chamber 60, and thence through the port 64 and fluid pressure delivery pipe 24 to the fluid pressure actuated motors 26 of the brakes associated with the front wheels of the vehicle.

When the pressure on the fluid in the chamber 40 exceeds the load on the spring 94 plus the pressure on the fluid in the chamber 60, the piston 72 advances and the conical end 100 of the extension 96 on the head 92 of the piston seats in the conical portion 62 of the chamber 60 and effectively closes the port 64. During this movement of the piston 72, the valve 114 is moved to its closed position under the influence of the spring 116.

Upon conclusion of a braking operation, the foot pedal lever 12 is released and is automatically returned to its retracted position under the influence of the retractile spring 16. As the foot pedal lever returns to its retracted position, the fluid pressure producing device 10 returns to its position of rest. This results in release of pressure on the fluid in the system and, accordingly, release of pressure on the fluid in the ratio changer, whereupon the ratio changer returns to its normal position and the fluid in the fluid pressure actuated motors 26 and the fluid pressure piping system connecting the motors to the fluid pressure device is returned to the fluid pressure device under the influence of the retractile springs 36 connecting the shoes 34 of the respective brake structures.

It may be noted that as the pressure in chamber 40 is reduced in releasing the brakes, the ball 114 remains on its seat, and the pressure in chamber 60 remains relatively higher for an instant so that the plunger 72 is immediately withdrawn to open the port 64.

In the modification of the invention, fluid under pressure enters the chamber 138 by way of the port 146 and is displaced therefrom past the valve 178 through the axial passage 174 and passage 176 into the chamber 140, thence through port 150 and the fluid pressure delivery pipe to the fluid pressure actuated motors.

When the pressure on the fluid in the chamber 140 exceeds the load on the spring 170 plus the pressure on the fluid in the chamber 138, the piston 152 moves to the left and the valve 178 closes, and upon an increase of pressure on the fluid in the chamber 138, exceeding the pressure on the fluid in chamber 140, the valve again opens to establish communication between the chambers 138 and 140 by way of the axial passage 174. This action may be repeated, and the result is that a change in the ratio of effectiveness of the two sets of brakes is accomplished. That is to say up until the time the spring 170 is overcome, the pressures in the chambers 138 and 140 are equal. When the spring 170 is overcome the pressure in 138 becomes higher than the pressure in 140 but thereafter maintains a uniform ratio thereto. The action in maintaining this uniform ratio is either a fluttering of the valve as described above, or a restriction of the opening to maintain differential pressures.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid pressure braking system, a pressure producing device, two sets of brakes operatively connected to the device, and a ratio changer connected between the device and one of the sets of brakes comprising a reciprocable member adapted to be subjected to opposing pressures, said member having a passage therethrough and a valve for controlling the passage.

2. In a fluid pressure braking system, a pressure producing device, two sets of brakes operatively connected to the device, and a ratio changer connected between the device and one of the sets of brakes comprising a reciprocable member having heads of different areas adapted to be subjected to opposing pressures, said member having a passage therethrough and valve mechanism for controlling the passage.

3. The combination defined by claim 1 in which the ratio changer comprises a cylinder, a double end piston reciprocable therein having a passage therethrough, and a valve for controlling the passage.

4. The combination defined by claim 1 in which the ratio changer comprises a double diametral cylinder, a double end piston reciprocable therein having a head complementary to the different diameters of the cylinder, said piston having a passage therethrough, and a valve for control of the passage.

5. The combination defined by claim 1 in which the ratio changer comprises a cylinder having a small chamber and a large chamber, a piston having a small head movable in the small chamber and a large head movable in the large chamber, said piston having a passage therethrough, and valve mechanism for controlling the passage.

6. The combination defined by claim 1 in which the ratio changer comprises a cylinder having a small chamber and a large chamber, a detachable head on the cylinder having therein a chamber of smaller diameter than the diameter of the small chamber of the cylinder, a piston reciprocable in the large chamber of the cylinder having oppositely disposed heads movable respectively in the small chamber of the cylinder and the chamber in the detachable head, and a controlled passage through the piston and its respective heads.

7. The combination defined by claim 1 in which the ratio changer comprises a cylinder having one of its ends closed and its other end open, a small chamber in the closed end of the cylinder and a large chamber in the open end of the cylinder, a detachable head on the open end of the cylinder having therein a chamber of smaller diameter that the small chamber of the cylinder, a piston reciprocable in the large chamber having oppositely disposed heads, one movable in the small chamber of the cylinder and the other movable in the chamber in the detachable head, and a controlled passage through the piston and heads.

8. The combination defined by claim 1 in which the ratio changer comprises a cylinder having one of its ends closed and its other end open, a small chamber in the closed end of the cylinder having an inlet port, a large chamber in the open end of the cylinder, a detachable head on the open end of the cylinder having therein a chamber of smaller diameter than the small chamber of the cylinder and a discharge port, a piston reciprocable in the large chamber having oppositely disposed heads, one movable in the small chamber of the cylinder and the other movable in the chamber of the detachable head, a passage through the piston and its respective heads, and valve mechanism for controlling the passage.

9. The combination defined by claim 1 in which the ratio changer comprises a cylinder having one of its ends closed and its other end open, a small chamber in the closed end of the cylinder having an inlet port and a large chamber in the open end of the cylinder, a detachable head on the open end of the cylinder having therein a chamber of smaller diameter than the small chamber of the cylinder and a discharge port, a piston reciprocable in the large chamber having oppositely disposed heads, one movable in the small chamber of the cylinder and the other movable in the chamber of the detachable head, a plunger carried by the piston for control of the discharge port, a passage through the piston, a spring-pressed valve controlling the passage, and a spring interposed between the piston and the detachable head.

10. The combination defined by claim 1 in which the ratio changer comprises a double diametral cylinder having one of its ends open and its other end closed, a detachable head on the open end of the cylinder, said cylinder having inlet and outlet ports, a piston reciprocable in the cylinder having oppositely disposed heads movable respectively in the complementary parts of the cylinder, said piston having a passage therethrough, and a valve for controlling the passage.

11. The combination defined by claim 1 in which the ratio changer comprises a double diametral cylinder having one of its ends open and its other end closed, a detachable head on the open end of the cylinder, said cylinder having inlet and outlet ports, a piston reciprocable in the cylinder having oppositely disposed heads movable respectively in the complementary parts of the cylinder, an extension on the piston adapted to seat on the detachable head, a spring interposed between the piston and the closed end of the cylinder, said piston having a passage therethrough and a spring-pressed valve controlling the passage having a stem extending through said passage and adapted to cooperate with the removable head.

12. The combination defined by claim 1 in which the ratio changer comprises a double diametral cylinder and differential pressure responsive means for opening and closing the discharge port.

13. The combination defined by claim 1 in which the ratio changer comprises a double diametral cylinder and differential pressure responsive means for opening and closing the valve controlling the discharge passage.

14. The combination defined by claim 1 in which the ratio changer comprises a differential pressure responsive means for progressively maintaining a constant ratio between the inlet and outlet pressures.

RUDOLPH A. GOEPFRICH.